(12) United States Patent
Rinne

(10) Patent No.: US 9,609,036 B2
(45) Date of Patent: Mar. 28, 2017

(54) METHOD AND APPARATUS FOR APPROVING MULTIMEDIA DATA

(71) Applicant: P2S Media Group Oy, Helsinki (FI)

(72) Inventor: Timo Johannes Rinne, Helsinki (FI)

(73) Assignee: P2S Media Group Oy, Helsinki (FI)

( * ) Notice: Subject to any disclaimer, the term of this patent is extended or adjusted under 35 U.S.C. 154(b) by 474 days.

(21) Appl. No.: 14/367,929

(22) PCT Filed: Dec. 19, 2012

(86) PCT No.: PCT/FI2012/051272
§ 371 (c)(1),
(2) Date: Jun. 22, 2014

(87) PCT Pub. No.: WO2013/098477
PCT Pub. Date: Jul. 4, 2013

(65) Prior Publication Data
US 2014/0365605 A1   Dec. 11, 2014

(30) Foreign Application Priority Data
Dec. 29, 2011   (FI) ..................................... 20116333

(51) Int. Cl.
*H04L 29/06* (2006.01)
*H04N 1/333* (2006.01)
*H04W 4/06* (2009.01)

(52) U.S. Cl.
CPC ....... *H04L 65/601* (2013.01); *H04N 1/33315* (2013.01); *H04W 4/06* (2013.01); *H04N 1/33361* (2013.01)

(58) Field of Classification Search
CPC .............. H04L 65/601; H04N 1/33315; H04N 1/33361; H04W 4/06
See application file for complete search history.

(56) References Cited

U.S. PATENT DOCUMENTS 7,991,837 B1 *  8/2011  Tahan ................... G06F 3/0481
                                                      348/240.3
8,251,283 B1 *  8/2012  Norton .................. G06K 7/084
                                                        235/375
(Continued)

FOREIGN PATENT DOCUMENTS

EP         0982668 A2    3/2000
EP         1561181 B1    8/2003
(Continued)

OTHER PUBLICATIONS

National Board of Patents and Registration of Finland; Search Report mailed Oct. 30, 2012; Patent Application No. 20116333.
(Continued)

*Primary Examiner* — Saket K Daftuar
(74) *Attorney, Agent, or Firm* — Ziegler IP Law Group, LLC

(57) ABSTRACT

A method and apparatus for approving multimedia data, including: receiving second multimedia data of a second resolution; selecting a block of the second multimedia data; and requesting a corresponding block of first multimedia data, to the selected block of the second multimedia data. Furthermore, the method includes receiving the corresponding block of the first multimedia data of a first resolution; and approving the second multimedia data at the server apparatus in response to evaluating the received block of the first multimedia data.

7 Claims, 5 Drawing Sheets

(56) References Cited

U.S. PATENT DOCUMENTS

| | | | |
|---|---|---|---|
| 8,265,686 B2* | 9/2012 | Klassen | G06F 17/3089 455/466 |
| 9,369,507 B2* | 6/2016 | Friend | H04L 29/08 |
| 9,398,095 B2* | 7/2016 | Terra Rios | H04N 1/333 |
| 2001/0026376 A1 | 10/2001 | I'Anson | |
| 2004/0215625 A1 | 10/2004 | Svendsen et al. | |
| 2005/0052685 A1 | 3/2005 | Herf et al. | |
| 2006/0044599 A1 | 3/2006 | Lipowitz et al. | |
| 2007/0198632 A1* | 8/2007 | Peart | H04L 12/2812 709/203 |
| 2008/0064425 A1* | 3/2008 | Kim | H04L 1/0003 455/466 |
| 2008/0165960 A1* | 7/2008 | Woo | G06F 17/30781 380/201 |
| 2008/0172315 A1 | 7/2008 | Farouki et al. | |
| 2009/0070820 A1 | 3/2009 | Li | |
| 2009/0222482 A1* | 9/2009 | Klassen | G06F 17/30241 |
| 2011/0280474 A1* | 11/2011 | Kaushal | G06K 9/036 382/159 |
| 2011/0289136 A1* | 11/2011 | Klassen | H04N 1/32101 709/203 |
| 2013/0318476 A1* | 11/2013 | Sauve | G06F 9/4443 715/835 |
| 2015/0222590 A1* | 8/2015 | Luo | H04L 61/1511 709/245 |

FOREIGN PATENT DOCUMENTS

| | | |
|---|---|---|
| EP | 1589460 A1 | 4/2005 |
| WO | 0141018 A2 | 6/2001 |

OTHER PUBLICATIONS

International Search Report and Written Opinion; International Searching Authority; mailed Jun. 6, 2013; PCT Application No. PCT/FI2012/051272.
Written Opinion of the International Preliminary Examination Authority (IPEA); PCT/FI2012/05051272; Apr. 30, 2014; (14 pages).

* cited by examiner

800

810

800

METHOD AND APPARATUS FOR APPROVING MULTIMEDIA DATA

TECHNICAL FIELD

The present application generally relates to a method and an apparatus for approving a received multimedia data. The present application further relates to a method and an apparatus for confirming an existence of a high resolution original multimedia data based on a received low resolution multimedia data.

BACKGROUND ART

A mobile apparatus may create multimedia data using, for example, camera and voice recording means for producing still images and/or streaming voice or video data. The mobile apparatus may also have some connectivity means for connecting the device to a network or to another device for uploading the captured images from the storage media of the camera to another storage media.

Services exist in networks, e.g. in the Internet, for managing data, e.g. multimedia data, received from mobile apparatuses. The services are typically accessed via a web browser or using a client application made specifically for the purpose of accessing the service. Data connection from the mobile apparatus to a service system server for uploading the captured multimedia may be limited in speed. For environmental or network based reasons, for example, the data transfer speed of the data connection may be too slow for transmitting the original high resolution multimedia data.

Mobile apparatuses are also connectable to devices such as cameras using a wired or wireless data communication means. The wired data communication means may be e.g. a USB (Universal Serial Bus) connection. The wireless data communication means may utilize be e.g. a Bluetooth or a Wireless LAN connection between the apparatus and the camera.

Because the service system provides multimedia data for users, the existence of the original multimedia data is required. A solution for confirming the captured multimedia data for a server apparatus receiving the multimedia data, is needed. Such confirmation should also improve the authenticity of the multimedia captured by a certain multimedia device.

SUMMARY

According to a first example aspect of the present disclosure there is provided a user apparatus comprising:
 a communication interface for transceiving multimedia data;
 at least one processor; and
 at least one memory including computer program code;
 wherein the at least one memory and the computer program code configured to, with the at least one processor, cause the user apparatus to:
  convert first multimedia data of a first resolution into second multimedia data of a second resolution which is lower than the first resolution;
  transmit the second multimedia data for approving to a server;
  receive a request for a corresponding block of the first multimedia data, to a selected block of the second multimedia data; and
  transmit the corresponding block of the first multimedia data of the first resolution.

In an embodiment, the at least one memory and the computer program code further configured to, with the at least one processor, cause the user apparatus to:
 detect an available speed of the communication interface; and
 convert the first multimedia data of the first resolution into the second multimedia data of the second resolution in response to detecting the available speed of the data communication channel.

In an embodiment, the at least one memory and the computer program code further configured to, with the at least one processor, cause the user apparatus to:
 receive a request for a group of corresponding blocks of the first multimedia data, to a selected group of blocks of the second multimedia data; and
 transmit the group of corresponding blocks of the first multimedia data of the first resolution.

The group of the corresponding blocks of the first multimedia data may be selected using at least one of the following:
 a random selection; and
 a fixed selection.

According to a second example aspect of the present disclosure there is provided a server apparatus comprising:
 a communication interface for transceiving multimedia data;
 at least one processor; and
 at least one memory including computer program code;
 wherein the at least one memory and the computer program code configured to, with the at least one processor, cause the server apparatus to:
  receive second multimedia data of a second resolution;
  select a block of the second multimedia data;
  request a corresponding block of first multimedia data, to the selected block of the second multimedia data;
  receive the corresponding block of the first multimedia data of a first resolution; and
  approve the second multimedia data at the server apparatus in response to evaluating the received block of the first multimedia data.

In an embodiment, the at least one memory and the computer program code further configured to, with the at least one processor, cause the server apparatus to:
 select a group of blocks of the second multimedia data;
 request a group of corresponding blocks of first multimedia data, to the group of selected blocks of the second multimedia data;
 receive the group of the corresponding blocks of the first multimedia data of the first resolution; and
 approve the second multimedia data at the server apparatus in response to evaluating the received blocks of the first multimedia data.

In an embodiment, the at least one memory and the computer program code further configured to, with the at least one processor, cause the server apparatus to:
 select the group of blocks of the second multimedia data using at least one of the following:
  a random selection; and
  a fixed selection.

The selected group of blocks may be separated from each other at least with a minimum distance.

In an embodiment, a size of the selected block is at least one of the following:
 a fixed size block; and
 a dynamic size block based on a defined percentage of a size of the second multimedia data.

According to a third example aspect of the present disclosure there is provided a method for approving multimedia data, wherein the method comprising:
  converting first multimedia data of a first resolution into second multimedia data of a second resolution which is lower than the first resolution;
  transmitting the second multimedia data for approving to a server apparatus;
  receiving a request for a corresponding block of the first multimedia data, to a selected block of the second multimedia data; and
  transmitting the corresponding block of the first multimedia data of the first resolution.

According to a fourth example aspect of the present disclosure there is provided a method for approving multimedia data, wherein the method comprising:
  receiving second multimedia data of a second resolution;
  selecting a block of the second multimedia data;
  requesting a corresponding block of first multimedia data, to the selected block of the second multimedia data;
  receiving the corresponding block of the first multimedia data of a first resolution; and
  approving the second multimedia data at the server apparatus in response to evaluating the received block of the first multimedia data.

According to a fifth example aspect of the present disclosure there is provided a computer program embodied on a computer readable medium comprising computer executable program code which, when executed by at least one processor of a user apparatus, causes the user apparatus to:
  convert first multimedia data of a first resolution into second multimedia data of a second resolution which is lower than the first resolution;
  transmit the second multimedia data for approving for a server apparatus;
  receive a request for a corresponding block of the first multimedia data, to a selected block of the second multimedia data; and
  transmit the corresponding block of the first multimedia data of the first resolution.

According to a sixth example aspect of the present disclosure there is provided a computer program embodied on a computer readable medium comprising computer executable program code which, when executed by at least one processor of a server apparatus, causes the server apparatus to:
  receive second multimedia data of a second resolution;
  select a block of the second multimedia data;
  request a corresponding block of first multimedia data, to the selected block of the second multimedia data;
  receive the corresponding block of the first multimedia data of a first resolution; and
  approve the second multimedia data at the server apparatus in response to evaluating the received block of the first multimedia data.

Different non-binding example aspects and embodiments of the present disclosure have been illustrated in the foregoing. The above embodiments are used merely to explain selected aspects or steps that may be utilized in implementations of the present disclosure. Some embodiments may be presented only with reference to certain example aspects of the present disclosure. It should be appreciated that corresponding embodiments may apply to other example aspects as well.

BRIEF DESCRIPTION OF THE DRAWINGS

The present disclosure will be described, by way of example only, with reference to the accompanying drawings, in which.

DETAILED DESCRIPTION

In the following description, like numbers denote like elements.

Figure 1:
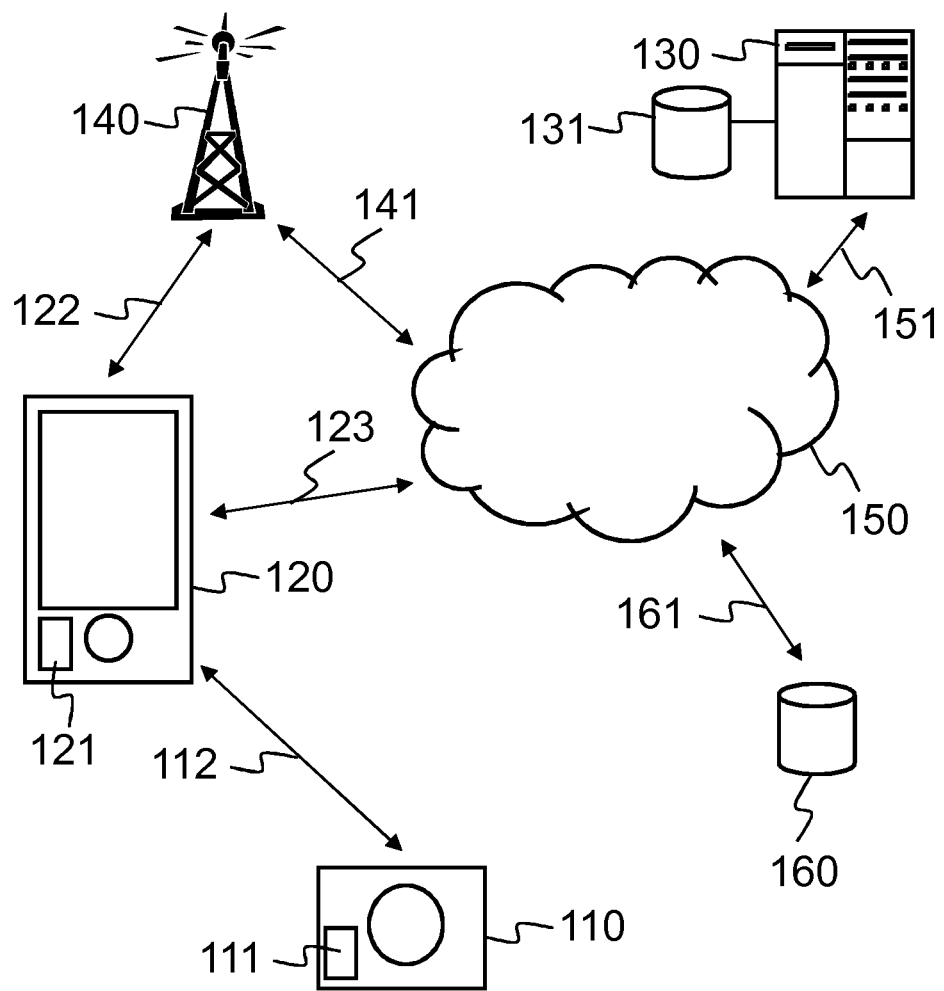
FIG. 1 shows a schematic picture of a system according to an example embodiment of the present disclosure.

FIG. 1 shows a schematic picture of a system 100 according to an example embodiment of the present disclosure. The system 100 comprises a multimedia device 110 configured to be capable of capturing multimedia, such as digital still images and/or video streams. The multimedia device 110 may comprise a storage 111 for multimedia data. The storage 111 may comprise a flash memory card, for example. The multimedia device 110 is configured to be connectable to a user apparatus 120 over a data connection 112. The data connection 112 may be a wired connection or a wireless connection. The wired connection may comprise Universal Serial Bus (USB), High-Definition Multimedia Interface (HDMI) or local area network (LAN), for example. The wireless connection may comprise Bluetooth™, Radio Frequency Identification (RF-ID) or wireless local area network (WLAN), for example.

The multimedia device 110 is configured to send captured multimedia data over the data connection 112 to the user apparatus 120. Such transmittal may be initiated by a user of the multimedia device 110, by a user of the user apparatus 120, or automatically based on settings. Such settings may comprise for example time of the day, amount of newly captured multimedia data or existence of the data connection 112 for the multimedia device 110.

The user apparatus 120 may comprise a multimedia device 110, a mobile phone, an internet tablet or a laptop computer, for example. The user apparatus 120 is capable of downloading and locally executing software program code. The software program code may be a client application of a service whose server application is running on the server apparatus 130 of the system 100. The user apparatus 120 may comprise multimedia capturing element, such as a camera, for capturing multimedia, such as still images or video streams, for example. The user apparatus 120 may also have a metadata element 121 for creating data usable as metadata of the multimedia content captured by the multimedia device 110. The metadata element 121 may comprise at least one of the following: a microphone, a positioning device for determining the current location of the user apparatus 120, and a clock. The user apparatus 120 is configured to be connectable to a wireless communication network 140 over a wireless connection 122. The wireless connection 122 may comprise a mobile cellular network or a wireless local area network (WLAN), for example. The wireless communication network may be to a public data communication network 150, for example the Internet, over a data connection 141. The user apparatus 120 may be configured to be connectable to the public data communication network 150 directly over a data connection 123. The data connection 123 may comprise a wired or wireless connection, such as a local area network (LAN) or a wireless local area network (WLAN), for example.

In an embodiment, the system 100 comprises a server apparatus 130, which comprises a storage device 131 for storing multimedia and metadata received over a data connection 151. The system 100 may further comprise an external database 160, wherein multimedia and metadata may be stored over a data connection 161. The metadata stored in either of the storage device 131 or the external database 160 may comprise reference metadata, such as a multimedia device identifier, multimedia device model information, software version information of the multimedia device, resolution information of the multimedia device or parameters of a camera of the multimedia device, for example.

In an embodiment, multimedia data captured by a user may travel to a server apparatus 130 over different paths. A first path may comprise sending multimedia data captured by a proprietary application of a user apparatus 120 over a wireless communication network 122, 140, 141 and public data communication network 150, 151 to the server apparatus 130. A second path may comprise sending multimedia data captured by a default application of a user apparatus 120 over a wireless communication network 122, 140, 141 and public data communication network 150, 151 to the server apparatus 130. A third path may comprise sending multimedia data captured by a multimedia device 110 to the user apparatus 120 and therefrom over a wireless communication network 122, 140, 141 and public data communication network 150, 151 to the server apparatus 130. A fourth path may comprise sending multimedia data captured by the multimedia device 110 to a computer apparatus (not shown) and therefrom over the public data communication network 150, 151 to the server apparatus 130.

In an embodiment, the proprietary application in the user apparatus 120 may be a client application of a service whose server application is running on the server apparatus 130 of the system 100. The proprietary application may capture the multimedia data for the first path. Also metadata for the captured multimedia may be retrieved by the proprietary application from the metadata elements 121 of the user apparatus 120. The default application may be an imaging application of the user apparatus 120. For the second path, the multimedia data captured by the default application may be imported to the proprietary application before transmitting to the server apparatus 130. The proprietary application may check the multimedia data and extract and apply metadata for the multimedia data. For the third path, the multimedia may be captured by the multimedia device 110 and transmitted to the proprietary application of the user apparatus 120 for sending to the server apparatus 130. The proprietary application may check the multimedia data and extract and apply metadata for the multimedia data. User may provide additional metadata using the user apparatus 120. For the fourth path, the multimedia may be captured by the multimedia device 110 and transmitted to a communication application of a computer apparatus. The communication application may check the multimedia data and extract and apply metadata for the multimedia data. User may provide additional metadata using the computer apparatus. In a further embodiment, the user may access the multimedia data on the server apparatus and provide additional metadata.

In an embodiment, multimedia data may be transmitted from a user apparatus 120 over a wireless communication network 122, 140, 141. Depending on the status of the communication network 122, 140, 141 and the user apparatus 120, the data transmission speed of the multimedia data may vary. The user apparatus 120 may be attached to a network operator that is capable of providing a reduced data transfer speed or the user apparatus 120 may have a limited access to the communication network 122, 140, 141, for example.

Figure 2:
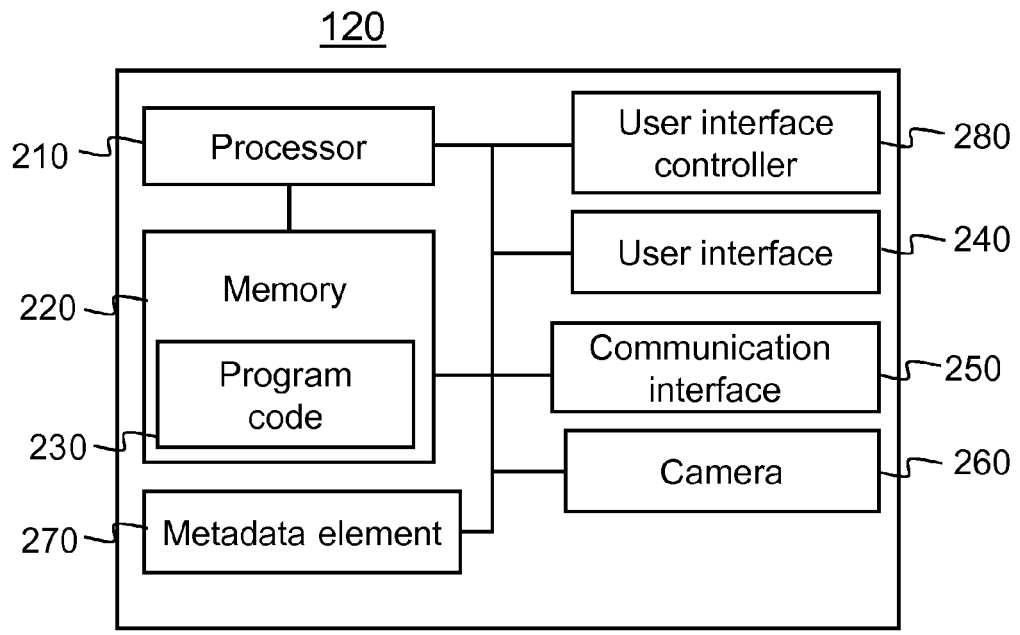
FIG. 2 presents an example block diagram of a user apparatus in which various embodiments of the present disclosure may be applied.

FIG. 2 presents an example block diagram of a user apparatus 120 in which various embodiments of the present disclosure may be applied. The user apparatus 120 may be a multimedia device 110, a user equipment (UE), a user device or an apparatus, such as a mobile terminal, a smart phone or other communication device.

The general structure of the user apparatus 120 comprises a user interface 240, a communication interface 250, a metadata element 270, a camera 260, a processor 210, and a memory 220 coupled to the processor 210. The user apparatus 120 further comprises software 230 stored in the memory 220 and operable to be loaded into and executed in the processor 210. The software 230 may comprise one or more software modules and can be in the form of a computer program product. The software 230 may also provide metadata information relating to the software and hardware of the user apparatus 120. The software 230 may also provide converting multimedia data from a first resolution to a second resolution and providing requested blocks of multimedia data. The user apparatus 210 may further comprise a user interface controller 280.

The processor 210 may be, e.g., a central processing unit (CPU), a microprocessor, a digital signal processor (DSP), a graphics processing unit, or the like. FIG. 2 shows one processor 210, but the user apparatus 120 may comprise a plurality of processors.

The memory 220 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The user apparatus 120 may comprise a plurality of memories. The memory 220 may be constructed as a part of the user apparatus 120 or it may be inserted into a slot, port, or the like of the user apparatus 120 by a user. The memory 220 may serve the sole purpose of storing data, or it may be constructed as a part of an apparatus serving other purposes, such as processing data. A proprietary multimedia application, a default multimedia application and multimedia data may be stored to the memory 220.

The user interface controller 280 may comprise circuitry for receiving input from a user of the user apparatus 120, e.g., via a keyboard, graphical user interface shown on the display of the user interfaces 240 of the user apparatus 120, speech recognition circuitry, or an accessory device, such as a headset, and for providing output to the user via, e.g., a graphical user interface or a loudspeaker.

The metadata element 270 comprises element configured to provide metadata information. Such elements may comprise, for example, a positioning device, an accelerometer, a temperature gauge, a clock or a microphone.

The camera 260 may be a still image camera or a video stream camera, capable for creating multimedia data and providing metadata information.

The communication interface module 250 implements at least part of radio transmission. The communication interface module 250 may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as universal serial bus (USB), for example. The communication interface module 250 may be integrated into the user apparatus 120, or into an adapter, card or the like that may be inserted into a suitable slot or port of the user apparatus 120. The communication interface module 250 may support one radio interface technology or a plurality of technologies. The user apparatus 120 may comprise a plurality of communication interface modules 250. Captured multimedia may be transmitted to a wireless communication network 140 using the communication interface 250.

A skilled person appreciates that in addition to the elements shown in FIG. 2, the user apparatus 120 may comprise other elements, such as microphones, extra displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the user apparatus 120 may comprise a disposable or rechargeable battery (not shown) for powering when external power if external power supply is not available.

In an embodiment, the user apparatus 120 comprises speech recognition means. Using these means, a pre-defined phrase may be recognized from the speech and translated into a metadata tag. This tag may then be used as any other metadata, for example for characterizing the captured multimedia or for grouping images together, for example.

Figure 3:
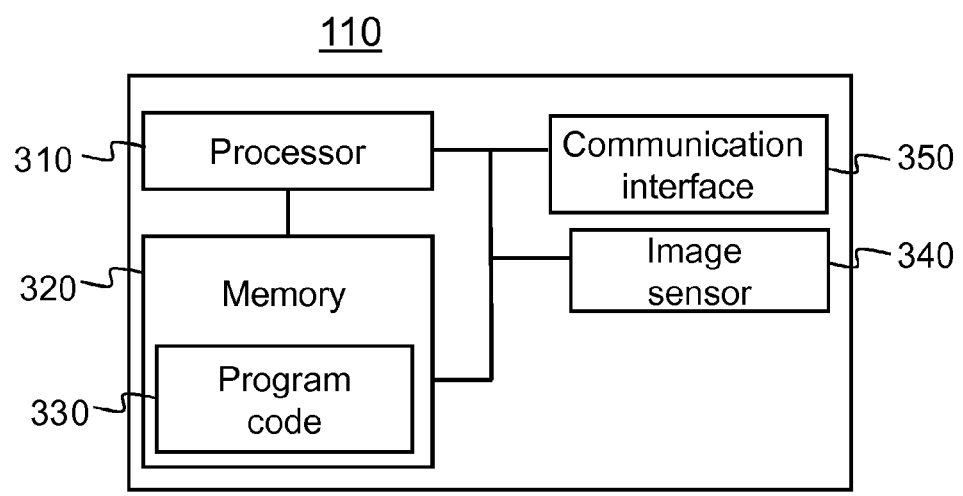
FIG. 3 presents an example block diagram of a multimedia device in which various embodiments of the present disclosure may be applied.

FIG. 3 presents an example block diagram of a multimedia device 110 in which various embodiments of the present disclosure may be applied. The multimedia device 110 may be a digital still camera or digital video camera, for example.

The general structure of the multimedia device 110 comprises an image sensor 340, a processor 310, and a memory 320 coupled to the processor 310. The multimedia device 110 further comprises software 330 stored in the memory 320 and operable to be loaded into and executed in the processor 310. The software 330 may comprise one or more software modules and can be in the form of a computer program product. The software 330 may provide metadata information of the software or hardware of the multimedia device 110.

The processor 310 may be, e.g., a central processing unit (CPU), a microprocessor, a digital signal processor (DSP), a graphics processing unit, or the like. FIG. 3 shows one processor 310, but the multimedia device 110 may comprise a plurality of processors.

The memory 320 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The multimedia device 110 may comprise a plurality of memories. The memory 320 may be constructed as a part of the multimedia device 110 or it may be inserted into a slot, port, or the like of the multimedia device 110 by a user. The memory 320 may serve the sole purpose of storing data, or it may be constructed as a part of an apparatus serving other purposes, such as processing data.

The image sensor 340 may be a device converting an optical image into an electronic signal, for example a charge-coupled device (CCD) or a complementary metal-oxide-semiconductor (CMOS) active pixel sensor. The image sensor 340 may provide metadata information of the image sensor 340.

The communication interface module 350 implements at least part of radio transmission. The communication interface module 350 may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as universal serial bus (USB), for example. The communication interface module 350 may be integrated into the multimedia device 110, or into an adapter, card or the like that may be inserted into a suitable slot or port of the multimedia device 110. The communication interface module 350 may support one radio interface technology or a plurality of technologies. The multimedia device 110 may comprise a plurality of communication interface modules 350. Captured multimedia data of the multimedia device 110 may be transmitted to a user apparatus 120 or to a computer apparatus using the communication interface 350.

A skilled person appreciates that in addition to the elements shown in FIG. 3, the multimedia device 110 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the multimedia device 110 may comprise a disposable or rechargeable battery (not shown) for powering when external power if external power supply is not available.

Figure 4:
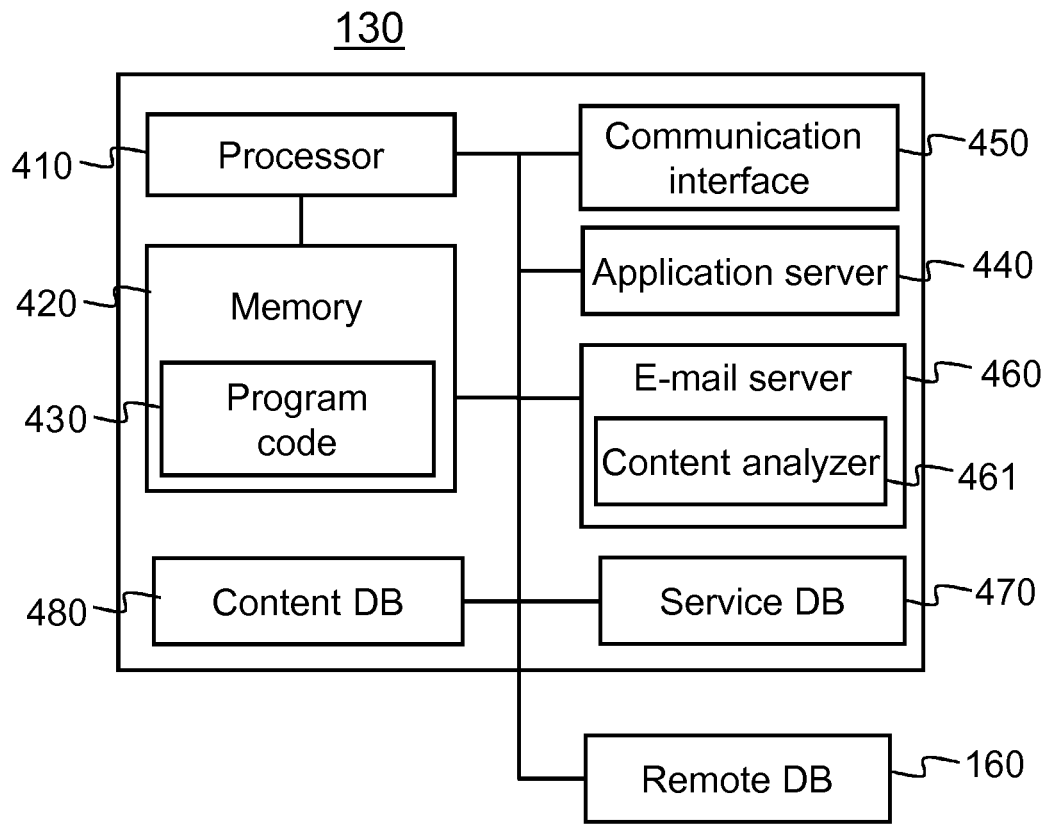
FIG. 4 presents an example block diagram of a server apparatus in which various embodiments of the present disclosure may be applied.

FIG. 4 presents an example block diagram of a server apparatus 130 in which various embodiments of the present disclosure may be applied.

The general structure of the server apparatus 130 comprises a processor 410, and a memory 420 coupled to the processor 410. The server apparatus 130 further comprises software 430 stored in the memory 420 and operable to be loaded into and executed in the processor 410. The software 430 may comprise one or more software modules and can be in the form of a computer program product.

The processor 410 may be, e.g., a central processing unit (CPU), a microprocessor, a digital signal processor (DSP), a graphics processing unit, or the like. FIG. 4 shows one processor 410, but the server apparatus 130 may comprise a plurality of processors.

The memory 420 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The server apparatus 130 may comprise a plurality of memories. The memory 420 may be constructed as a part of the server apparatus 130 or it may be inserted into a slot, port, or the like of the server apparatus 130 by a user. The memory 420 may serve the sole purpose of storing data, or it may be constructed as a part of an apparatus serving other purposes, such as processing data.

The communication interface module 450 implements at least part of radio transmission. The communication interface module 450 may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as universal serial bus (USB), for example. The communication interface module 450 may be integrated into the server apparatus 130, or into an adapter, card or the like that may be inserted into a suitable slot or port of the server apparatus 130. The communication interface module 450 may support one radio interface technology or a plurality of technologies. The server apparatus 130 may comprise a plurality of communication interface modules 450. Captured multimedia data of the multimedia device 110 or the user apparatus 120 may be received by the server apparatus 130 using the communication interface 450.

The e-mail server process 460, which receives e-mail messages sent from user apparatuses 120 and computer apparatuses via the network 150. The server 460 may comprise a content analyzer module 461, which checks if the content of the received message meets the criteria that are set for new content data of the service. The content analyzer module 461 may for example check, whether the e-mail message contains a valid still image or a video stream. The content analyzer module 461 may check the received blocks of the multimedia data and approve the multimedia data into the service in response to a successful evaluation of the blocks. The valid content data, such as multimedia data, received by the e-mail server is then sent to an application server 440, which provides application services e.g. relating to the user accounts stored in a user service database 470 and content of the content management service. In the service database 470 received blocks of multimedia data and the low resolution multimedia data for multimedia data approving may be stored. The blocks of multimedia data and the low resolution multimedia data may also be stored in the external database 160, wherein multimedia and blocks of multimedia may be stored over a data connection.

User account information may be stored in the service database 470 or in the external database 160. The user account information may comprise information of registered users and their registered apparatuses. Registration information may comprise for example, a multimedia device type, multimedia device model information or software version information of the multimedia device, for example. Content provided by the service system 100 is stored in a content database 480.

A skilled person appreciates that in addition to the elements shown in FIG. 4, the server apparatus 130 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like.

Figure 5:
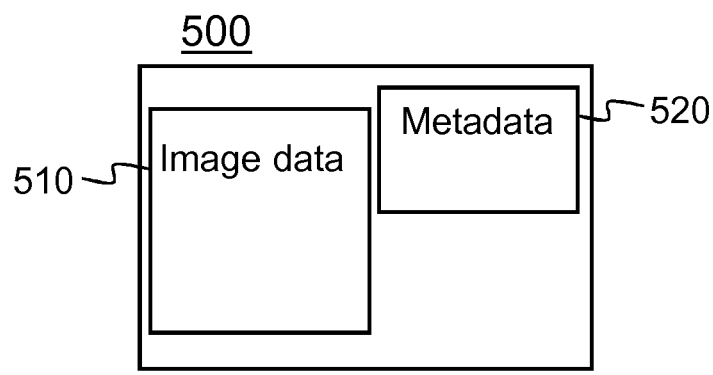
FIG. 5 shows an overall block diagram of an example multimedia data item.

FIG. 5 shows an overall block diagram of an example multimedia data item 500 according to an example embodiment of the present disclosure.

The multimedia data item 500 comprises multimedia data 510, such as image data. Furthermore, the multimedia data item 500 comprises metadata 520. In an embodiment, the metadata 520 comprises multimedia device information. The metadata 520 may further comprise metadata tags.

The metadata 520 may be written into the multimedia data item 500 for identifying who owns the multimedia data 510, copyright & contact information, what camera created the file, along with exposure information and descriptive information such as keywords about the photo, making the file searchable on the computer and/or the Internet. Some metadata 520 may be written by the camera and further metadata 520 may be input by the photographer, user and/or computer software after downloading the multimedia data 510 to a computer, for example.

The metadata 520 may be configured to use a certain standard format, such as Exchangeable Image Format (EXIF). Specifically, FIG. 5 illustrates a single digital image 500 stored in the EXIF format, such as in a file on a computer or on a removable media device in a digital camera. As will be appreciated by those skilled in the art, an EXIF file 500 may contain multiple digital images having a similar format. The metadata 520 may also comprise at least two metadata, for example simple metadata and complex metadata. In FIG. 5 only a single metadata 520 is showed, for simplicity. The metadata 520 may include tags. The tags include information such as descriptions, copyright information, date and time information, camera settings such as camera model and make, and information that varies with each image such as orientation (rotation), aperture, shutter speed, focal length, metering mode, location information, and ISO speed information. The tags may further comprise a thumbnail for previewing the picture on the camera's LCD screen, in file managers, or in photo manipulation software.

The metadata 520 format may comprise standard tags for location information. Cameras and mobile devices may have a built-in GPS receiver or a cellular positioning device that stores the location information in the metadata tags when the picture is taken. Some other cameras have a separate GPS receiver that fits into the flash connector, for example. Recorded GPS data can also be added to any digital photograph on a computer, either by correlating the time stamps of the photographs with a GPS record from a hand-held GPS receiver or manually using a map or mapping software. The process of adding geographic information to a photograph is known as geocoding. A system server may allow their users to upload geocoded pictures or to add geolocation information online.

In an embodiment, geographic location data is comprised in the tags. Furthermore, the device info may be comprised in the tags.

In an embodiment, the metadata 520 may be configured to use any other standard format, such as:
  IPTC Information Interchange Model IIM (International Press Telecommunications Council),
  IPTC Core Schema for XMP,
  XMP—Extensible Metadata Platform (an Adobe standard),
  Dublin Core (Dublin Core Metadata Initiative—DCMI), or
  PLUS (Picture Licensing Universal System).

Figure 6:
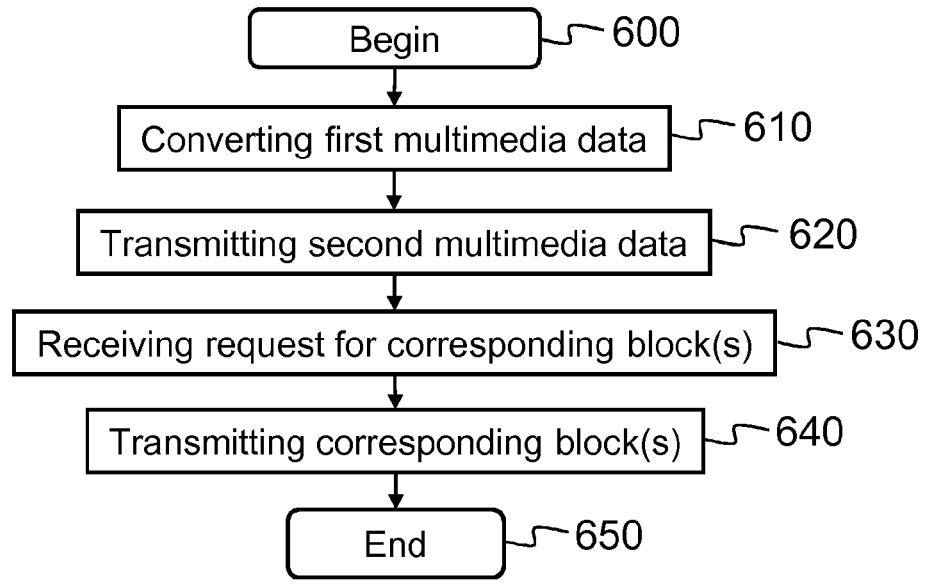
FIG. 6 shows a flow diagram showing operations in accordance with an example embodiment of the present disclosure.

FIG. 6 shows a flow diagram showing operations in accordance with an example embodiment of the present disclosure. In step 600, the method is started. In step 610, first multimedia data of a first resolution is converted, by a user apparatus, into second multimedia data of a second resolution which is lower than the first resolution. The second multimedia data is transmitted for approving to a server apparatus of the service in step 620. In step 630, a request for a corresponding block of the first multimedia data, to a selected block of the second multimedia data, is received. The corresponding block of the first multimedia data of the first resolution is transmitted for the server apparatus in step 640. The method ends in step 650. The block may also comprise a group of blocks.

Figure 7:
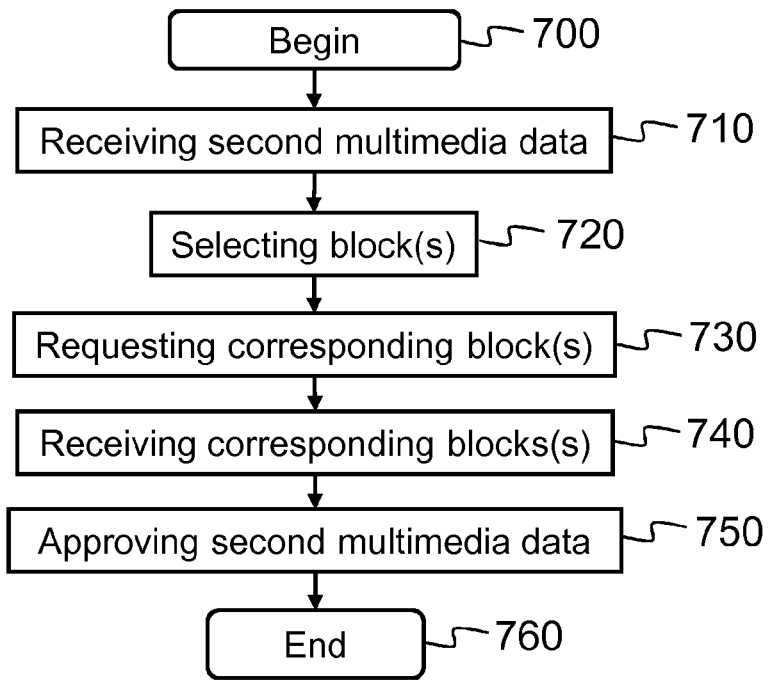
FIG. 7 shows a flow diagram showing operations in accordance with an example embodiment of the present disclosure.

FIG. 7 shows a flow diagram showing operations in accordance with an example embodiment of the present disclosure. In step 700, the method is started. In step 710, second multimedia data is received at a server apparatus. In step 720, a block of the second multimedia data is selected. A corresponding block, to the selected block, of the first multimedia data is requested in step 730. In step 740, the corresponding block of the first multimedia data of the first resolution is received. The second multimedia data is approved at the server of the service in response to evaluating the received block in step 750. The block may also comprise a group of blocks.

Figure 8A:
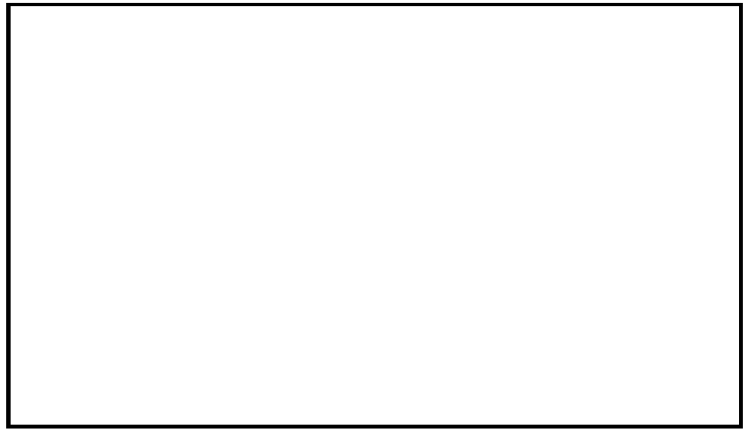
FIGS. 8a-c show schematic pictures of selecting and transceiving blocks of multimedia data according to an example embodiment of the present disclosure.
Figure 8B:
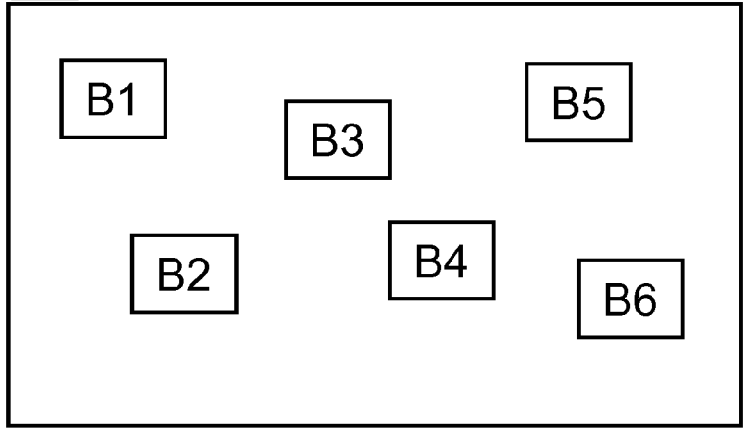
Figure 8C:
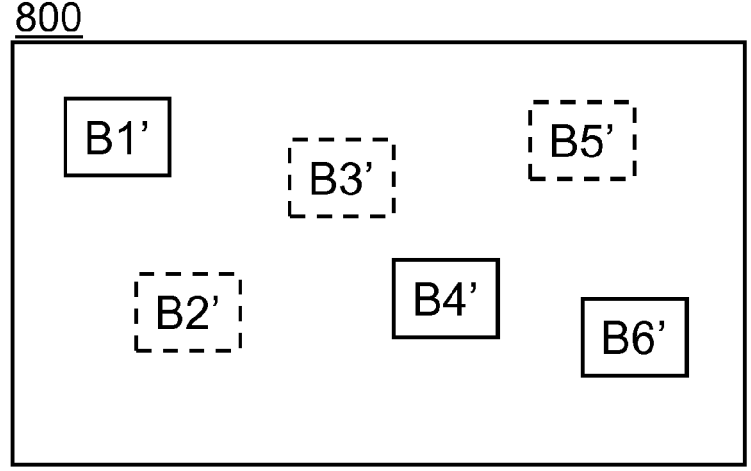

FIGS. 8*a-c* show schematic pictures of selecting and transceiving blocks of multimedia data according to an example embodiment of the present disclosure.

In an embodiment, a user apparatus or a multimedia device captures first multimedia data 800, such as an image. The captured first multimedia data 800 is of a first resolution, depending on a camera device characteristics and settings. A user of the apparatus may want to transmit the captured first multimedia data 800 to a server of a service. However, due to network performance the transfer speed to transmit the captured first multimedia data 800 to the server may be too slow. The user apparatus may convert the captured first multimedia data 800 of the first resolution into a second multimedia data 810 of a second resolution. The second resolution is lower than the first resolution enabling a file size of the multimedia data to be reduced. The reduced size file is easier for the user apparatus to transmit for the server. The second multimedia data 810 of the second resolution is illustrated in FIG. 8*b*. The second multimedia data 810 may be transmitted to the server apparatus for approving the second multimedia data 810 to a service.

In an embodiment, the server apparatus receives the second multimedia data 810. The server apparatus may desire to ensure the existence of the original high resolution multimedia data 800 before approving the second multimedia data 810 to the service. At least one block B1-B6 may be selected by the server apparatus of the second multimedia data 810, as illustrated in FIG. 8*b*. In FIG. 8*b*, altogether six blocks B1-B6 is defined, as an example. The blocks may be selected randomly or selectively, for example of certain locations in the second multimedia data 810. Such locations may comprise for example borders of multimedia data objects. After selecting at least one block B1-B6 of the second multimedia data 810, the server apparatus may request corresponding block B1'-B6' of the original captured first multimedia data 800. The request may be transmitted to the user apparatus and comprise information of the requested block, for example a location and a size of the block.

In an embodiment, the user apparatus receives the request for the block B1'-B6' of the first multimedia data 800, corresponding to the selected block B1-B6 of the second multimedia data 810. In case a group of corresponding blocks B1'-B6' is requested by the server apparatus, the user apparatus may determine all the requested blocks or a group of the corresponding blocks. In FIG. 8*c* all the corresponding blocks B1'-B6' of the high resolution first multimedia data 800 are illustrated. B1', B4' and B6' are selected by the user apparatus to be transmitted back to the server apparatus, in an example embodiment. The server apparatus may receive the corresponding block B1'-B6' or the group of corresponding blocks B1', B4', B6' for evaluation. The server apparatus may evaluate the received block B1'-B6' or the group of corresponding blocks B1', B4', B6' to confirm that the user apparatus transmitting the low resolution second multimedia data 810 also comprises the high resolution first multimedia data 800. The evaluation may utilize for example quality measurement of the received corresponding block or the group of corresponding blocks. Multimedia data parameters, such as contrast, brightness, sharpness, gamma, saturation, hue or white balance may be evaluated as well as metadata of the second multimedia data 810. Based on the evaluation the server apparatus may approve the second multimedia data 810 to the service if the evaluation supports the existence of the high resolution first multimedia data 800.

In an embodiment, a number, a size and a position of the block or group of blocks may vary. The number of the requested blocks may comprise at least one block and the transmitted corresponding blocks may comprise all requested blocks or at least one requested block. The size of the requested blocks may be defined by the server apparatus or defined to be fixed, for example m×n pixels. Furthermore, the size may be defined to be a certain percentage of the size of the second multimedia data 810. The position of the requested blocks may be defined by the server apparatus or the user apparatus to be positioned at least within a certain minimum distance from each other.

Various embodiments have been presented. It should be appreciated that in this document, words comprise, include and contain are each used as open-ended expressions with no intended exclusivity. If desired, the different functions discussed herein may be performed in a different order and/or concurrently with each other. Furthermore, if desired, one or more of the above-described functions may be optional or may be combined. Although various aspects of the present disclosure are set out in the independent claims, other aspects of the present disclosure comprise other combinations of features from the described embodiments and/or the dependent claims with the features of the independent claims, and not solely the combinations explicitly set out in the claims.

The foregoing description has provided by way of non-limiting examples of particular implementations and embodiments of the present disclosure a full and informative description of the best mode presently contemplated by the inventors for carrying out the present disclosure. It is however clear to a person skilled in the art that the present disclosure is not restricted to details of the embodiments presented above, but that it can be implemented in other embodiments using equivalent means or in different combinations of embodiments without deviating from the characteristics of the present disclosure.

Furthermore, some of the features of the above-disclosed embodiments of this present disclosure may be used to advantage without the corresponding use of other features. As such, the foregoing description shall be considered as merely illustrative of the principles of the present disclosure, and not in limitation thereof. Hence, the scope of the present disclosure is only restricted by the appended patent claims.

The invention claimed is:
1. A mobile apparatus comprising:
 a wireless communication interface for transceiving multimedia data;
 at least one processor; and
 at least one memory including computer program code;

the at least one memory and the computer program code configured to, with the at least one processor, cause the mobile apparatus to:

detect an available speed of the wireless communication interface;

convert first multimedia data of a first resolution into second multimedia data of a second resolution which is lower than the first resolution in response to detecting the available speed of the wireless data communication interface;

transmit the second multimedia data for approving to a server apparatus;

receive a request from the server apparatus for a block of the first multimedia data, corresponding to a selected block of the second multimedia data; and transmit the requested block of the first multimedia data of the first resolution to the server apparatus.

2. The mobile apparatus of claim 1, wherein the at least one memory and the computer program code further configured to, with the at least one processor, cause the mobile apparatus to:

detect an available speed of the wireless communication interface; and convert the first multimedia data of the first resolution into the second multimedia data of the second resolution in response to detecting the available speed of the wireless data communication channel of the wireless communication interface being too slow for transmitting the first multimedia data of the first resolution.

3. The mobile apparatus of claim 1, wherein the at least one memory and the computer program code further configured to, with the at least one processor, cause the mobile apparatus to:

receive a request for a group of corresponding blocks of the first multimedia data, to a selected group of blocks of the second multimedia data; and transmit the group of corresponding blocks of the first multimedia data of the first resolution.

4. The mobile apparatus of claim 3, further comprising:

selecting the group of the corresponding blocks of the first multimedia data using at least one of the following:
a random selection; and
a fixed selection.

5. A method for approving multimedia data, the method comprising:

detecting an available speed of a wireless communication interface of a mobile apparatus;

converting, by the mobile apparatus, first multimedia data of a first resolution into second multimedia data of a second resolution which is lower than the first resolution in response to detecting the available speed of the data communication interface;

transmitting, by the mobile apparatus, the second multimedia data for approving to a server apparatus;

receiving a request from the server apparatus for a block of the first multimedia data, corresponding to a selected block of the second multimedia data; and transmitting, by the mobile apparatus, the requested block of the first multimedia data of the first resolution to the server apparatus.

6. A computer program embodied on a non-transitory computer readable medium comprising computer executable program code which, when executed by at least one processor of a mobile apparatus, causes the mobile apparatus to:

detect an available speed of a wireless communication interface of the mobile apparatus;

convert first multimedia data of a first resolution into second multimedia data of a second resolution which is lower than the first resolution in response to detecting the available speed of the data communication interface;

transmit the second multimedia data for approving to a server apparatus;

receive a request from the server apparatus for a block of the first multimedia data, corresponding to a selected block of the second multimedia data; and transmit the requested block of the first multimedia data of the first resolution to the server apparatus.

7. The mobile apparatus of claim 1, wherein the multimedia data comprises a digital image.

* * * * *